Feb. 10, 1959  G. W. KEARNEY  2,872,888
PIPE ALIGNING TOOL
Filed Jan. 5, 1956
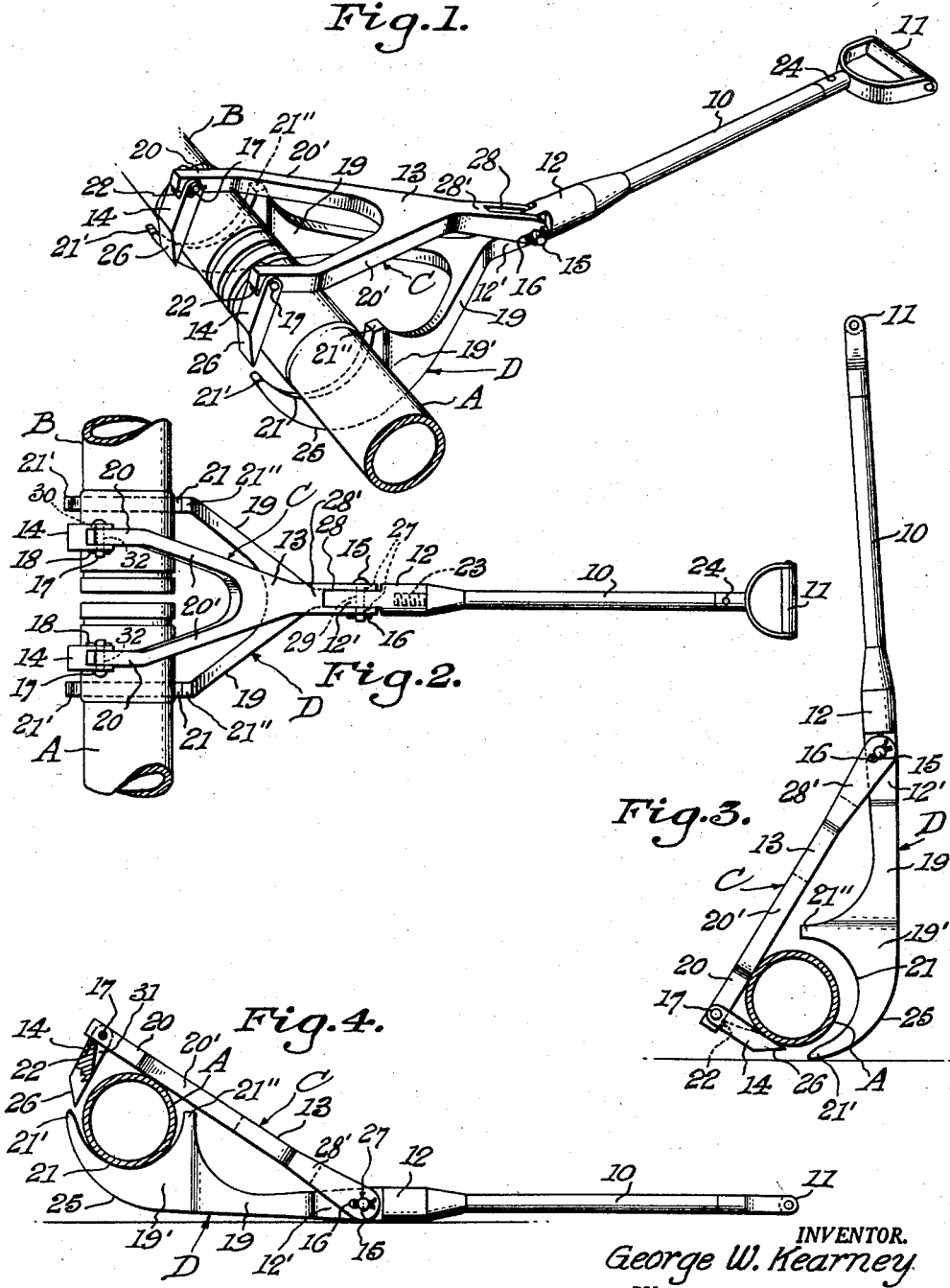
INVENTOR.
George W. Kearney
BY
ATTORNEYS

United States Patent Office 2,872,888
Patented Feb. 10, 1959

2,872,888

PIPE ALIGNING TOOL

George W. Kearney, Arlington, Va.

Application January 5, 1956, Serial No. 557,615

2 Claims. (Cl. 113—102)

(Granted under Title 35, U. S. Code (1952), sec. 266)

The invention described herein may be manufactured and used by or for the Government of the United States for governmental purposes without the payment of any royalty thereon.

The present invention provides improvements in manually operated hand tools employed for facilitating aligning of contiguous sections of pipe employed in the construction of pipe lines, or for facilitating the manipulation of other similar shapes which are to be joined in end-to-end relation.

In constructing pipe lines where successive sections of pipe are to be connected, frequently difficulty is experienced in obtaining an accurate alignment of such successive sections, as well as placing the same in a position enabling convenient and rapid uniting of adjoining ends of the section in a requisite sturdy joint of a fluid-tight character for enabling the completed pipe line to transport fluids of either liquid or gaseous character without loss thereof through leakage at the location of the pipe line joints.

The present invention provides a manually operated tool which is adapted to grip successive sections of pipe which enter into construction of a pipe line, accurately aligning such successive sections and maintaining them in accurate alignment while contiguous ends thereof are being joined together, while at the same time elevating such sections to bring the contiguous ends thereof into a position of convenient access to enable such contiguous ends to be united to a fluid-tight joint by any suitable uniting operations such as by welding, bolting, or the like.

This may be considered to be the principal object of the improved tool construction, together with the provision of such a manually operated tool which is adapted to be used for the indicated purpose with widely different sizes and which prevents accidental release of the pipe sections during the aligning and joining manipulations.

Other objects and advantages of the present construction will become apparent as the following detailed description of the structural features of the improved tool proceeds, and the features of novelty will be defined in particularity in the appended claims.

The invention will be understood more particularly with reference to the accompanying drawings, in which Fig. 1 is a perspective view of the tool in holding position with respect to contiguous sections of pipe;

Fig. 2 is a plan view of the tool and pipe sections held in alignment thereby;

Fig. 3 is a side elevation of the tool, partly in section, showing the tool in initial pipe-receiving position; and Fig. 4 is a view generally similar to Fig. 3, but showing the tool rotated into position for elevating the pipe sections to enable convenient access thereto for joining together the contiguous ends of the pipe sections.

Referring more particularly to the drawings, there are shown pipe sections A and B which are to be joined together, these sections being illustrated in aligned relation and are being retained in the improved aligning tool of the present invention in readiness for being joined together.

Such tool comprises cooperating tool elements C and D which are mounted on an end of a handle bar 10, to the opposite end of which is secured a hand-grip 11, this element being secured in a conventional manner to the handle bar 10, such as by means of a fastening pin 24.

The tool elements C and D are secured to an end of the handle bar 10 opposite to the hand-grip 11 and form a pipe-receiving and retaining assembly of which element C is an upper component and element D is a lower component, the handle bar 10 being shown as being threadably received in an enlarged connector 12 with which the lower tool element D is shown as being integral and to which the upper tool element C is shown as being pivotally connected by a tongue and slot connection, the connector 12 being provided with a tongue element 12' which is received in a slot 28 in the upper tool element C, this latter member being secured to the said tongue element by a pivot pin 15 which is passed through aligned holes provided for the purpose and indicated at 27 in the sides of the slot and at 29 in the tongue 12'. The pivot pin 15 is secured by a cotter pin 16. The detailed structure of this tool element C will be described more fully hereinafter.

The lower tool element D is shown as being integral with the connector 12, this latter member being threadably secured to the handle bar 10 by threads 23. The tool element D includes similar side arms or branches 19 diverging equally from connector 12 and terminating in parallel pipe-receiving end sections 19' which include identical recesses 21 for receiving the pipe sections A and B. These recesses 21 are in the upper side of the tool element D and terminate in forward inserting tips 21' and rear abutment stops 21", the latter limiting the extent of reception of the pipe sections A and B in the tool element D.

It will be evident that the tips 21' of the pipe-receiving element D are adapted to be inserted beneath the pipe sections A and B when the handle bar 10 and gripping member 11 are suitably elevated, the tips 21' being inserted beneath the pipe sections by manually pushing on the handle bar 10 and gripping member 11 until by manually depressing the handle bar and grip as a lever, the pipe sections A and B are caused to enter the recesses 21.

An important feature of the present tool is the fact that the undersides of the substantially parallel end sections 19' are arcuately formed, as is indicated at 25, the curvature of such arcuate surfaces 25 being on a radius substantially longer than that of the recesses 21, so that the said surfaces 25, which start at the tips 21' and extend to the length of the sections 19' that is, coincident with the abutment stops 21", are eccentric with respect to the recesses 21 and define lifting cam surfaces along which the leverage fulcrum continuously shifts responsively to depressing the handle bar 10 and gripping element 11, thereby lifting the pipe sections until they roll into the recesses 21, the stops 21" preventing over-running of the pipe sections during manipulation of the tool, during which the tool is moved from an elevated position such as shown in Fig. 3, to a substantially flat or horizontal position shown in Fig. 4. During this movement the locus of the lever fulcrum moves continuously along the arcuate surfaces 25, with attendant raising of the pipe sections A and B until they are seated properly in recesses 21.

Further reference now may be made to structural details of the upper tool element C. As will be noted from the drawings, this element C is complemental to the lower tool element D, described above. It also has been pointed out above that this upper tool element C is pivotally mounted on the tongue 12' of the connector 12, this tongue 12' fitting into slot 28 in shank portion 28' of the tool element C. As is apparent from the drawings, this tool element is expandingly bifurcated from its shank portion 28', as is designated at 13, to form lateral diverging arms 20' which terminate in approximately parallel end sections 20. Like the end sections 19' of the tool element D, these end sections 20 are integral with the arms 20'. Each of the end sections 20 has pivotally connected thereto by means of pivot pins 17, a retaining wedge 14 having a beveled end 26 adapted to pivot inwardly relative to the end sections 20 for engaging the pipe sections A and B for preventing accidental displacement thereof over wedge tips 21' during manipulations of the sections, as well as supplementing the action of the wedge tips in passing the pipe sections A and B into recesses 21 as the handle bar 10 is shifted from upright position as shown in Fig. 3 to substantially horizontally depressed position of Fig. 4. These retaining wedges 14 are prevented from pivoting outwardly beyond the end sections 20 by abutment stops 22 which engage the under surfaces of the end sections 20 for outward stoppage of the pivotal movement of these retaining wedges 14, the clearance 31, formed by inwardly beveling the inner surfaces of the wedges from the stops 22, providing clearance for inward movement of the wedges 14 during appropriate manipulations of the handle bar 10 of the tool. The wedge members 14 therefore restrain the pipe sections A and B from accidentally rolling out of these recesses 21 before the sections are joined together. Also, these wedges 14 act as pipe-aligning means by forcing equally the pipe sections A and B against abutment stops 21" during manipulations of the tool.

The upper tool element C is illustrated by the drawings as being of substantially less width than the lower tool element D, this provision enhancing the manipulations of pipe sections of widely differing sizes, since the tool element C cannot abut against the abutments 21". However, without loss of utilitarian functions, the upper tool element may be actually wider than the lower element D with impairment of such functions. It will be understood, moreover, that various other structural changes in the tool as herein illustrated and described may be made without departing from the scope of the invention as may be found necessary or desirable by an operator skilled in the art. Consequently, it will be understood that it is intended and desired to embrace within the scope of the invention such modifications and changes as may be necessary or desirable to adapt the invention to varying conditions and uses, as defined by the appended claims.

Having thus described my invention, what I claim as new and wish to secure by Letters Patent is:

1. In a hand tool for aligning and supporting sections of pipe to be interconnected, a fulcrum member comprising a plurality of planar members having upper and lower edges, aligned pipe receiving recesses in said upper edges, said lower edges being arcuately shaped at one end thereof and intersecting each of said recesses at one side thereof to provide wedge-like tips and curved fulcrum surfaces, the other side of each of said recesses intersecting its respective upper edge to form abutment stops for restraining the pipe sections in the recesses, an elongated lever member connected to said fulcrum member, and a complemental pipe engaging and retaining member pivotally connected to the end of said fulcrum member opposite the arcuately shaped ends of said planar members.

2. A tool for receiving and aligning successive sections of a complete assembly, which comprises a lever assembly including a tool head for receiving objects to be aligned successively in end-to-end relation, a handle bar for the tool head and a hand grip mounted on the handle bar at an end thereof opposite to the tool head, said tool head including a pair of complemental members for receiving the said sections of the complete assembly, one of said members being rigidly connected to said handle bar and being divergently bifurcated into a pair of similarly shaped side arms, said side arms comprising relatively large planar portions disposed substantially parallel to each other, each of said planar portions having an upper edge and a lower edge, said lower edge being arcuate in shape and intersecting said upper edge, a substantially semi-circular recess in said upper edge for receiving the sections, one side of said recess intersecting the junction of said lower and upper edges to form a wedge-like tip, the other side of said recess intersecting said upper edge to form an abutment stop for restraining the section in the recess, and the other of the complemental members of the tool head being pivotally mounted on said first-mentioned member adjacent its connection to said handle bar and also being divergently bifurcated into a pair of similarly shaped side arms, and a pair of retaining members each pivotally connected to a respective end of one of the side arms of said second bifurcated member for retaining said successive sections in aligned relationship in said recesses provided in said first bifurcated member as said tool head is rotated by said lever member manually from its initial vertical section engaging position along the arcuate fulcrum provided by said lower edges of said first mentioned member to a horizontal position.

References Cited in the file of this patent

UNITED STATES PATENTS

| | | |
|---|---|---|
| Re. 2,804 | Humes | Nov. 19, 1867 |
| 831,181 | Ohman | Sept. 18, 1906 |
| 1,435,587 | Crandall | Nov. 14, 1922 |
| 1,939,475 | Walsh | Dec. 12, 1933 |
| 2,686,648 | Oehler | Aug. 17, 1954 |
| 2,731,932 | Petersen | Jan. 24, 1956 |

FOREIGN PATENTS

| | | |
|---|---|---|
| 217,566 | Germany | May 8, 1908 |